Figure 3:
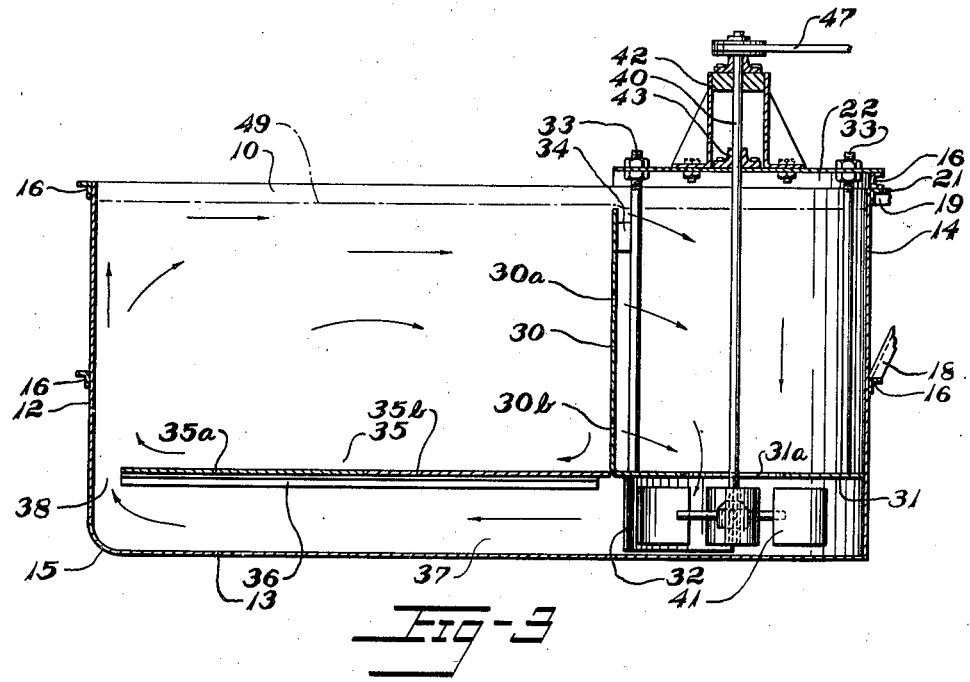

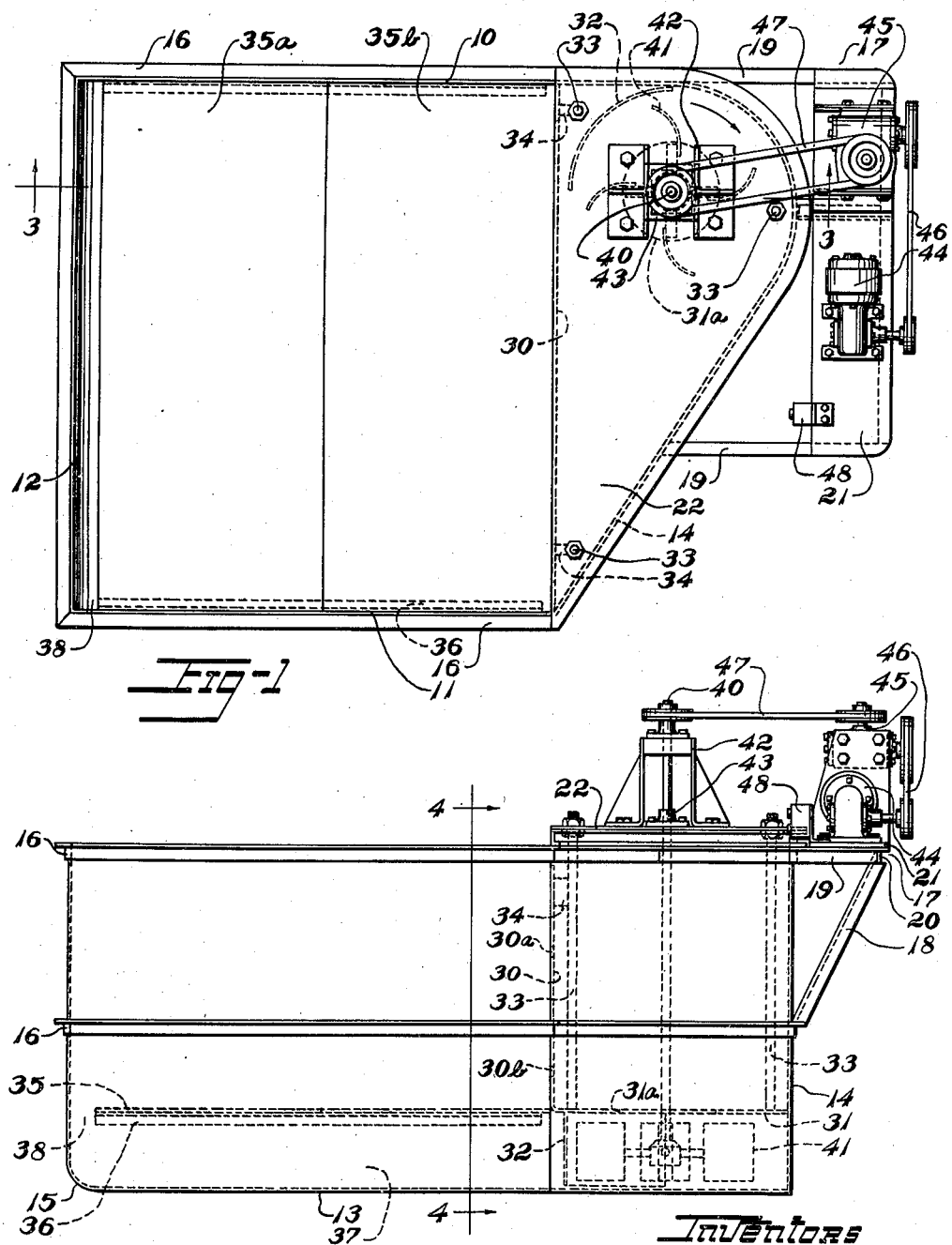

Nov. 22, 1949 — M. E. HANSEN ET AL — 2,488,773
APPARATUS FOR MAINTAINING THE HOMOGENEITY OF FLUID MATERIALS
Filed July 8, 1946 — 2 Sheets-Sheet 2

Inventors
Merrill E. Hansen
Earle A. Yount
By Nora S. Woodruff
Att'y

Patented Nov. 22, 1949

2,488,773

UNITED STATES PATENT OFFICE 2,488,773

APPARATUS FOR MAINTAINING THE HOMOGENEITY OF FLUID MATERIALS

Merrill E. Hansen, Silver Lake, and Earle A. Yount, Akron, Ohio, assignors to American Anode Inc., Akron, Ohio, a corporation of Delaware Application July 8, 1946, Serial No. 681,968

7 Claims. (Cl. 259—95)

This invention relates to apparatus for maintaining the homogeneity of fluid materials containing constituents of a nature that tend to separate from the body of fluid material by sedimentation, flotation, flocculation, coagulation and the like. The invention is particularly related to apparatus for maintaining the homogeneity of compounded latices and other dispersions to preserve them in a smooth state of dispersion for commercial dipping operations.

Manufacturers of latex dipped goods have encountered considerable difficulty in the past in maintaining large tanks of compounded latex in a suitable state of dispersion for dipping operations extending over a considerable length of time. Latices whether naturally occurring or artificially prepared have a tendency to "skinover" if allowed to stand in quiescent contact with the air. Consequently, it has been the custom to agitate the latex in the tanks to prevent this. However, difficulty has been incurred heretofore for agitation of a latex mix has a tendency to "beat-out" quantities of coagulum. Moreover, it has been found highly undesirable to agitate a latex mix so that the surface of the latex is disturbed by turbulence for variations in the depth of form immersion will then occur, greatly increasing product spoilage and material waste due to the necessity for trimming the deposit. Commercial dipping operations frequently utilize latices so heavily compounded with dispersed solids and liquids that difficulty has been encountered with separation of such compounding ingredients by sedimentation or flotation etc. The flocculated or coagulated rubber-like materials and the separated compounding ingredients tend to accumulate in the bottoms and square corners of the dipping tanks, even though agitated, with consequent undesirable change in composition of the body of latex mix.

Another problem concerning latex dipping tanks and the like has been the necessity for frequent cleaning during operations and for cleaning after the tank has been emptied when changing from one latex mix to another. Heretofore, it has been necessary to empty the tank and disassemble the agitation assembly in order to clean it.

A further problem frequently encountered in the operation of latex dipping tanks is the putrefaction by bacterial action of latex stagnating in quiet areas of the tank. The putrefaction is made possible by the changes in pH and other conditions occurring in the quiet areas. When a tank of latex contains small quantities of putrefied latex, its usefulness is greatly impaired and it is necessary to dispose of the entire contents of the tank and to begin anew with a fresh latex mix.

It is an object of this invention, therefore, to provide apparatus for maintaining the homogeneity of latex compositions and the like, which apparatus will effectively prevent skinning over of the latex and which will minimize separation of dispersed compounding ingredients without contributing to the formation of rubber flocs or coagulum, and which apparatus will not have quiet areas in which latex can stagnate and putrefy.

It is a further object to provide apparatus for maintaining the homogeneity of fluid materials, which apparatus will be easier to clean and maintain.

It is another object of this invention to provide a latex dipping tank which will provide a continually renewed fresh latex surface undisturbed by turbulence to prevent "skinning over" and to facilitate accurate regulation of the depth of form immersion.

A still further object of this invention is to provide a latex dipping tank in which uniform gentle circulation of the latex is obtained without the excessive agitation usually resulting in flocculation of the latex.

According to the invention, the tendency of the latex to "skin over" is counteracted by maintaining a substantial layer of fluid at the surface, where it contacts the air, in a gentle horizontal flow of substantially streamline character so that a smooth surface undisturbed by turbulence is presented to a forming member being dipped therein. The surface of the latex is continuously changed at a rate sufficient to minimize the action of the air on the rubber-like material of the latex. The tendency of the heavier ingredients to settle to the bottom or the tendency of the lighter materials to rise to the surface is counteracted by maintaining the body of latex in the tank in a gentle circulatory movement so that settling particles are caught and carried up by the upward component of the circulatory current while the lighter particles are caught and carried downward by the downward component of the same circulatory movement. The homogeneity of the entire body of latex or fluid material is maintained by continuously interchanging portions of the fluid from the circulatory movement of the body of the tank with portions of fluid from the surface circulatory stream.

In the preferred form of apparatus for carrying out the invention, the fluid material is divided, as described above, into two circulatory movements and novel means are provided for free interchange of fluid between the two fluid streams.

In the preferred form of apparatus a tank is provided with a vertical baffle dividing the tank into a container or dipping compartment and a separate sump compartment. A false bottom is provided which is divided into two parts by the baffle but with the false bottom defining a passageway under the baffle. The false bottom in the sump compartment is provided with an aperture which serves as an intake opening for an impeller located therebelow in the passageway. The false bottom in the dipping compartment is impervious and extends from the vertical baffle to within a short distance of the opposite end-wall so as to leave a slot-like opening at the end-wall which will permit liquid to move up the end-wall from the passageway beneath the false bottom to the surface of the tank.

The preferred form of apparatus is provided with a fluid moving device located beneath the false bottom adjacent the intake opening. The fluid moving device causes the fluid to move along the passageway under the container compartment and to rise up the end of the tank through the slot-like opening and to return back across the surface of the baffle where it overflows into the sump.

The vertical baffle is provided with several slot-like openings positioned above the false bottom but at such a height one above the other that the fluid moving device may draw fluid therethrough from the body of fluid in the container compartment. Thus, the impetus of the fluid being drawn downward through the baffle slots combined with the impetus of the fluid moving up the end-wall of the tank and across the surface of the fluid is sufficient to induce a circulatory movement of the main body of fluid in the container compartment. The fluid drawn into the sump through the openings in the baffle is mixed with the fluid from the stream moving on the surface of the tank, thus insuring homogeneity of the entire tank of latex.

The sump compartment of the preferred form of apparatus is of novel shape in order to reduce turbulency of the fluid leaving the impeller and to aid in achieving a uniform rate of flow across the entire width of the tank. The sump compartment is formed by a vertical end-wall which is shaped about an impeller shaft set considerably off-center from the center-line of the tank. The latter end-wall extends outwardly a short distance from its junction with one side wall then curves about an impeller shaft so as to form the outside wall of a circular housing for the impeller and then extends the rest of the way across the tank without substantial curvature from the rounded part of the housing to the point of juncture with the other side wall. A short baffle is provided depending from the false bottom in the sump compartment in a position to form a continuation of the curved impeller housing and to deflect portions of the fluid in order to obtain even transverse distribution of fluid leaving the impeller. Thus, fluid urged from the impeller loses a considerable part of its velocity in the expanding part of the sump compartment, and the relatively long path between the confining walls of the passageway under the dipping compartment, through which the fluid must move after it leaves the sump compartment, serves to further reduce velocity and turbulence so that the fluid moving up the end-wall of the tank will be substantially free of violent random motion.

The vertical baffle, the false bottom in the sump compartment and the impeller means are, in the preferred apparatus, assembled as an integral unit so as to be easily lifted from the tank for cleaning without disassembly and without draining the tank.

Figure 4:
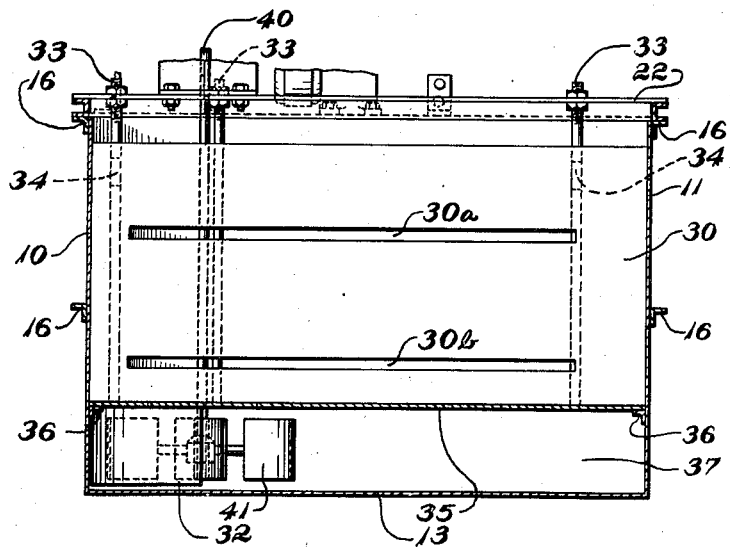

The structural details of a preferred form of apparatus will now be described with reference to the accompanying drawings, of which Fig. 1 is a plan view of the apparatus embodying this invention showing in particular the shape of the sump compartment and the location of the impeller shaft and its drive mechanism, Fig. 2 is a side elevational view of the tank shown in Fig. 1, Fig. 3 is a sectional view taken along the line 3—3 of Fig. 1, and Fig. 4 is a sectional view taken along the line 4—4 of Fig. 2.

Referring to the drawings, a preferred latex dipping tank of this invention comprises an outer shell, preferably of stainless steel sheet metal, comprising generally planar sides 10, 11, a generally planar end-wall 12 and generally planar bottom 13 defining a generally right angular container compartment, and a curved end-wall 14 curving outward a short distance from its junction with side wall 10 then rounding sharply to form the outside wall of circular housing for a fluid moving device and then extending across the tank without substantial curvature toward its junction with the other side wall 11 so as to form an outwardly extending but rounded sump compartment which resembles a triangular wedge laid with one leg along the end of the tank but having the acute angle formed by the outwardly extending leg and the hypotenuse arcuately truncated so that the hypotenuse of the triangle and the outwardly extending leg are tangent to the arcuately truncated corner. If the circumstances require a narrower tank, the straight portion of the end-wall 14 may be shortened as required without destroying all the desired operating characteristics. The sides 10, 11, ends 12, 14, and bottom 13 of the tank are joined, preferably with welded joints, the bottom 13 being curved upward to smoothly meet the planar end-wall 12 in a welded butt joint as indicated at 15, and the sides are braced at the top edge and at about median height by angle irons 16, 16 welded on the outside of the tank to form a bracing framework. At the curved end-wall 14 of the tank is provided a shelf 17 on which the driving mechanism is mounted, the shelf 17 comprising two bracing angle irons 18, two outwardly extending top arms 19, 19, a cross member 20, all of which are of ordinary angle iron welded together and secured by welded joints to the angle irons 16, 16, and a top plate 21 of heavy gauge steel plate secured to the top arms 19, 19 and the cross member 20 so as to form a shelf. The outwardly extending curved portion of the tank formed by the curved end-wall 14 is provided with a cover plate 22 of heavy gauge stainless steel plate.

A vertical baffle 30 separates the generally right angular body of the tank bounded by the planar walls from the outwardly extending portion bounded by the curved end-wall 14. The baffle 30 does not extend to the top edge of the tank but terminates therebelow in order to permit overflow from the container compartment into the sump compartment. Two horizontal slot-like openings 30a, 30b are positioned one above the other in the face of the baffle above the false bottom 31, so that a small quantity of fluid may pass directly through the baffle from the container or dipping compartment to the sump compartment. The baffle 30 extends down to within a short distance of the bottom 13, then is bent at right angles and butt-welded to the false bottom 31 so as to be integral therewith. The false bottom 31 comprises a flat plate, preferably of stainless steel, having a circular intake opening 31a, substantially concentric with the curvature of the end-wall 14 but being otherwise impervious. The circular intake opening 31a is located with its center slightly closer to the baffle than to the curved portion of the outside wall. A small curved baffle 32 is welded to the bottom surface of the false bottom 31 so as to hang downwardly therefrom almost to the bottom of the tank. The curved baffle 32 is of substantially the same curvature as the rounded portion of the end-wall 14 but its center of curvature is translated a short distance towards the outside wall 14 so that the baffle 32 is closer to the impeller than the impeller is to the wall 14, thus providing a constantly increasing volute to take the liquid moving off the ends of the impeller blades. The baffle 32 also serves to deflect a greater portion of fluid from the impeller housing out toward the straight portion of the end wall 14. In the preferred form of apparatus, it has been observed that the curved baffle 32 best performs its function when it encloses substantially one quadrant of the circular intake openings 31a so as to continue the curvature of the end-wall 14 within the sump compartment and around the intake opening 31a. The false bottom 31 is supported from the sump compartment cover plate 22 by three suspension bolts 33, 33. The vertical baffle 30 is also secured to the suspension bolts 33, 33 by welded-on brackets 34, 34. Thus, the cover plate 22, the vertical baffle 30, and the false bottom 31 are removable as a unit for cleaning purposes simply by lifting the assembly out of the tank.

The container or dipping compartment is also provided with an impervious false bottom 35 extending on the same level as the false bottom 31 and comprising two flat plates 35a, 35b, supported on two stainless steel angle irons 36, 36 welded to the inside surfaces of the planar side walls 10, 11. The false bottom 35 butts against the baffle 30 and extends to within a short distance of planar end-wall 12, thereby providing a passageway 37 leading from the sump under the baffle 30 to the end-wall 12 and leaving a narrow rectangular opening 38 leading upward from the passageway 37 to allow liquid to flow upward along the end-wall 12 to the surface.

An impeller shaft 40 is suspended in the sump compartment so as to position a curved-bladed paddle wheel impeller 41 below the intake opening 31a in the false bottom 31 of the sump compartment. A shaft support bearing 42 journals the upper end of the shaft 40 and a shaft guide bearing 43 is provided to steady the shaft 40 against rotational whip. Since the impeller support housing is supported from the sump cover plate 22, it will also be removed from the tank when the baffle 30, the false bottom 31 and the cover plate 22 are lifted from the tank.

The impeller shaft 40 is actuated by motor 44 acting through a gear reduction 45 and belts 46, 47. The motor 44 and the gear reduction 45 are mounted on the plate 21 of the shelf 17 extending from the curved end of the tank. For convenience of operation a start-stop switch 48 for the driving motor 44 may be located on the shelf plate 19, as shown in Fig. 1.

Care must be observed in operating the preferred form of the apparatus of this invention to maintain the liquid in the tank at a proper level in order to secure the much desired smooth flow across the surface of the liquid in the tank. It has been observed that proper operation of the preferred form of apparatus is obtained when the tank is filled (with the impeller shut off) to a standing height of one-half inch to one inch above the top edge of the baffle 30. The most desirable operation has been observed when the liquid level, as indicated by the dot and dash line 49, stood initially about one-half inch above the baffle. However, it is possible to operate the above-described latex tank when the liquid level is more than one inch above the baffle or less than one-half inch above the baffle if the impeller speed is correspondingly reduced or increased as is found necessary.

In order to more clearly comprehend the novel operating characteristics of the above-described apparatus, the reader should imagine the tank shown in the drawings to be filled with clear water into which small brightly colored scraps of paper have been thrown to aid in observing the circulation in the various parts of the apparatus. The various circulatory streams occurring in the tank as a result of the novel baffle arrangement and the novel location of the impeller have been indicated in Fig. 3 of the drawings by means of arrows. When the tank has been filled to the proper height and the impeller started, it will be observed that the level of liquid in the sump compartment drops slightly and liquid simultaneously begins to flow over the edge of the baffle 30. The liquid is drawn down through the intake opening 31a in the false bottom of the sump compartment and impelled out under the false bottoms with the liquid moving down the passageway 37 at substantially the same velocity at all points across the tank. It further will be observed that the small curved baffle 32 partially enclosing the impeller will turn or deflect the liquid out into the middle portion of the sump compartment but since the curved baffle does not extend all the way to the tank bottom, sufficient liquid is permitted to pass under and around the baffle to secure an even transverse distribution of the liquid even behind the baffle. The slanting straight portion of the sump compartment wall deflects a portion of the liquid impelled against it and turns it out into the center section of the tank; the remaining liquid passing along the straight portion of the end-wall 14 to flow along the planar side wall of the tank. In this manner, the column of liquid rising up the end of the tank through the passageway 37 will sweep the square corners of the tank clear of any stagnant liquid throughout the depth of the liquid. After rising up the end of the tank, the liquid turns smoothly and moves back across the surface of the tank finally flowing over the baffle 30. At the same time, liquid is drawn through the slot-like openings 30a, 30b in the face of the baffle 30 and is added to the surface stream while a small amount of liquid in the surface stream is slowed down sufficiently to cause it to join the circulatory stream in the body of the container compartment. Some of the scraps of paper are seen to gradually move along the top edge of the false bottom and to be picked up and carried into the surface stream moving up the end-wall of the tank. Scraps of paper rising to the surface are carried to the sump compartment over the edge of the baffle where they are mixed with the liquid being drawn through the slots in the baffle. It will be seen, therefore, that the entire body of latex is maintained in constant motion in a smooth state of dispersion.

The paddle type impeller of the apparatus of this invention is preferably rotated so as to deliver liquid from the convex surfaces of the curved blades for this has been found to produce less turbulence than when the impeller is rotated so as to deliver the liquid from the concave surfaces of the blades or from straight paddle type blades. The preferred direction of rotation of the impeller is indicated by an arrow in Fig. 1 of the drawings.

The apparatus of this invention may be utilized to maintain the homogeneity of natural rubber latex, artificially prepared aqueous dispersions of natural rubber, aqueous dispersions of the synthetic rubber-like polymers, aqueous dispersions of reclaimed natural rubber, aqueous dispersions of reclaimed synthetic rubber-like materials, and other dispersions of materials such as the vinyl resins and vinyl copolymer resins, olefinic polysulfides, waxes and the like as well as such other dispersions such as paint (which is composed largely of pigments dispersed in a vehicle, usually a drying oil), varnish, lacquers and the like as well as other liquid compositions used in coating, dipping, spreading and similar operations.

While the invention has been described with particular reference to a certain preferred embodiment thereof, it is possible to make variations and modifications therein without departing from the spirit and scope of the invention as defined in the appended claims.

We claim:

1. Apparatus for maintaining the homogeneity of aqueous dispersions of rubber and similar liquid materials normally tending toward heterogeneity, said apparatus comprising a tank adapted to contain said liquid having a pair of opposed end walls and a bottom wall and having a false bottom spaced from and coextensive with the bottom wall thereof but separated from one end wall of said tank by a relatively narrow gap, the second end wall thereof being cut away at the top to permit overflow of liquid, a sump adjacent the second end wall of said tank adapted to receive the overflow therefrom and communicating with said tank beneath said false bottom, said sump having an outwardly curved end wall, driving mechanism, and a paddle wheel impeller driven thereby and mounted for rotation in the sump adjacent the curve of said end wall in a horizontal plane disposed between the level of the false bottom and the level of the bottom wall of said tank.

2. Apparatus for maintaining the homogeneity of aqueous dispersions of rubber and similar liquid materials normally tending toward heterogeneity, said apparatus comprising a tank adapted to contain said liquid having a pair of opposed end walls and a bottom wall and having a false bottom spaced from and coextensive with the bottom wall thereof but separated from one end wall of said tank by a relatively narrow gap, the second end wall thereof being cut away at the top to permit overflow of liquid, a sump adjacent the second end wall of said tank adapted to receive the overflow therefrom and communicating with said tank beneath said false bottom, the outer wall of said sump being outwardly bowed to form a sump having a generally triangular horizontal section, driving mechanism, and a paddle wheel impeller driven thereby and mounted for rotation in the sump in a horizontal plane disposed between the level of the false bottom and the level of the bottom wall of said tank, said impeller being disposed adjacent the outward bow of said outer wall.

3. Apparatus for maintaining the homogeneity of aqueous dispersions of rubber and similar liquid materials normally tending toward heterogeneity, said apparatus comprising a tank adapted to contain said liquid having a pair of opposed end walls and a bottom wall and having a false bottom spaced from and coextensive with the bottom wall thereof but separated from one end wall of said tank by a relatively narrow gap, the second end wall thereof being cut away at the top to permit overflow of liquid, a sump adjacent the second end wall of said tank adapted to receive the overflow therefrom and communicating with said tank beneath said false bottom, the outer wall of said sump comprising a pair of generally vertical wall members lying in planes intersecting at an acute angle, the intersection of said wall members being rounded off to form an outwardly rounded corner, driving mechanism, and a paddle wheel impeller driven thereby and mounted for rotation in the rounded corner of said sump in a horizontal plane disposed between the level of the false bottom and the level of the bottom wall of said tank.

4. Apparatus for maintaining the homogeneity of aqueous dispersions of rubber and similar liquid materials normally tending toward heterogeneity, said apparatus comprising a tank adapted to contain said liquid having a pair of opposed end walls and a bottom wall and having a false bottom spaced from and coextensive with the bottom wall thereof but separated from one end wall of said tank by a relatively narrow gap, the second end wall thereof being cut away at the top to permit overflow of liquid and having at least one horizontally disposed slot beneath the normal liquid level to permit limited flow of liquid therethrough, a sump adjacent the second end wall of said tank adapted to receive the flow of liquid therefrom and communicating with said tank beneath said false bottom, the outer wall of said sump comprising a pair of generally vertical wall members of unequal length lying in planes intersecting at an acute angle, the intersection of said wall members being rounded off to form an outwardly rounded corner, driving mechanism, and a paddle wheel impeller driven thereby and mounted for rotation in the rounded corner of said sump in a horizontal plane disposed between the level of the false bottom and the level of the bottom wall of said tank, said impeller being disposed more closely adjacent the shorter of said wall members and being rotatable so that said liquid material is urged around said corner toward the longer of said wall members.

5. Apparatus for maintaining the homogeneity of aqueous dispersions of rubber and similar liquid materials normally tending toward heterogeneity, said apparatus comprising a tank adapted to contain said liquid having a pair of opposed end walls and a bottom wall and having a false bottom spaced from an coextensive with the bottom wall thereof but separated from one end wall of said tank by a relatively narrow gap, the second end wall thereof being cut away at the top to permit overflow of liquid and having at least one horizontally disposed slot beneath the normal liquid level to permit limited flow of liquid therethrough, a sump adjacent the second end wall of said tank adapted to receive the flow of liquid therefrom, said sump being generally right-triangular in horizontal section having the base of the triangle adjacent said second end wall with the outwardly extending vertex thereof rounded off, said sump having a bottom wall co-planar with the bottom wall of said tank and communicating with said tank in the zone beneath the false bottom thereof, driving mechanism, and a paddle wheel impeller driven thereby and mounted for rotation in the rounded-off vertex of said sump in a horizontal plane disposed between the level of the false bottom and the level of the bottom wall of said tank.

6. Apparatus for maintaining the homogeneity of aqueous dispersions of rubber and similar liquid materials normally tending toward heterogeneity, said apparatus comprising a tank adapted to contain said liquid including a bottom wall and pairs of opposing end walls and side walls, a generally vertically disposed baffle member extending between said side walls dividing said tank into a storage compartment adjacent one end wall and a sump compartment adjacent the other end wall, said baffle member extending from a zone slightly below the normal liquid level to a zone adjacent to but spaced from the bottom wall to permit flow of liquid above and below said baffle member, the end wall adjacent said sump compartment angling across said tank to meet said baffle member at its junction with one side wall and being curved to meet the opposing side wall in an outwardly extending corner, a false bottom for said tank spaced from the bottom wall extending from the end wall of said sump compartment to a zone adjacent to but spaced from the opposing end wall, said false bottom abutting the bottom edge of said baffle member and having a fluid opening therethrough located in the curved corner of said sump compartment, a driving mechanism, a paddle wheel impeller driven thereby and mounted for rotation in a horizontal plane beneath said fluid opening of the false bottom, and a curved baffle depending from said false bottom to a zone short of the bottom wall, said curved baffle constituting an extension of the curve of the end wall and extending inwardly from the adjacent side wall around one quadrant of the impeller.

7. Apparatus for maintaining the homogeneity of aqueous dispersions of rubber and similar liquid materials normally tending toward heterogeneity, said apparatus comprising a tank adapted to contain said liquid including a bottom wall and pairs of opposing end walls and side walls, a generally vertically disposed baffle member extending between said side walls dividing said tank into a storage compartment adjacent one end wall and a sump compartment adjacent the other end wall, said baffle member extending from a zone slightly below the normal liquid level to a zone adjacent to but spaced from the bottom wall to permit flow of liquid above and below said baffle member, the end wall adjacent said sump compartment angling across said tank to meet said baffle member at its junction with one side wall and being curved to meet the opposing side wall in an outwardly extending corner, a false bottom for said tank spaced from the bottom wall extending from the end wall of said sump compartment to a zone adjacent to but spaced from the opposing end wall, said false bottom abutting the bottom edge of said baffle member and having a fluid opening therethrough located in the curved corner of said sump compartment, a driving mechanism, a paddle wheel impeller driven thereby and mounted for rotation in a horizontal plane beneath said fluid opening of the false bottom, and a curved baffle depending from said false bottom to a zone short of the bottom wall, said curved baffle constituting an extension of the curve of the end wall and extending inwardly from the adjacent side wall around one quadrant of the impeller, said baffle member, impeller, and the portion of the false bottom within the sump together with the curved baffle being removable as a unit from said tank.

MERRILL E. HANSEN.
EARLE A. YOUNT.

REFERENCES CITED

The following references are of record in the file of this patent:

UNITED STATES PATENTS

| Number | Name | Date |
| --- | --- | --- |
| 539,363 | Johnson | May 14, 1895 |
| 1,727,974 | Halvorsen | Sept. 10, 1929 |
| 1,864,149 | Rockwell | June 21, 1932 |
| 1,934,916 | Dies | Nov. 14, 1933 |
| 1,986,019 | Shaffner | Jan. 1, 1935 |
| 2,011,646 | Moody | Aug. 20, 1935 |
| 2,210,160 | Beal | Aug. 6, 1940 |
| 2,287,591 | Adams | June 23, 1942 |